ns

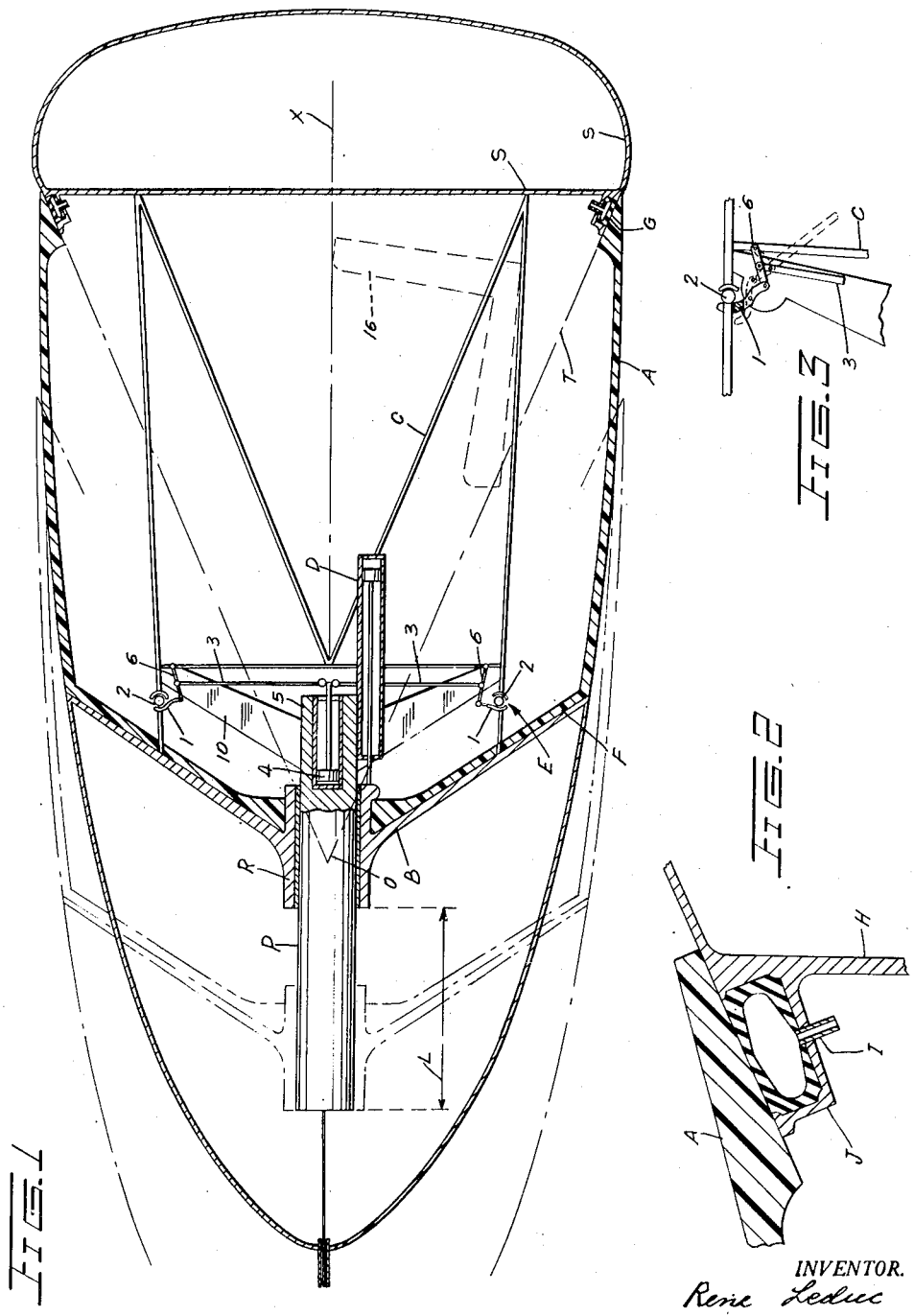

United States Patent Office 2,762,587
Patented Sept. 11, 1956

2,762,587
AIRCRAFT CABIN
René Leduc, Argenteuil, France
Application July 14, 1954, Serial No. 443,388
Claims priority, application France July 16, 1953
11 Claims. (Cl. 244—121)

The present invention relates to aircraft and more particularly to that part of an aircraft which houses the pilot or crew.

One of the objects of the present invention is to provide a cover for the pilot's cabin, this cover being mounted in such a way as to be movable as a unit to and from the closing position.

Another object of the present invention is to provide a cover of the above type which extends completely about the longitudinal axis of the aircraft.

A further object of the present invention is to provide an exceedingly simple structure for moving such a cover to and from its closed position.

An additional object of the present invention is to provide a means for releasably locking the cover in its closed position.

A still further object of the present invention is to provide a means for preventing different coefficients of thermal expansion of the different materials of the cabin from disturbing the closure of the same.

With the above objects in view the present invention mainly consists of an aircraft which includes a support means located along the longitudinal axis of the aircraft. A stationary annular abutment is carried by the support means and has its center in this longitudinal axis. An elongated tubular means has an axis coinciding with the longitudinal axis, has an open end in engagement with the annular abutment, and is closed at its end opposite to the open end thereof. A guide means is carried by the support means for guiding the tubular means for movement along the longitudinal axis of the aircraft away from the annular abutment to provide access to the space surrounded by the tubular means and back to engagement with the annular abutment for closing this space.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a partly schematic sectional elevational view of the front end of an aircraft constructed in accordance with the present invention, Fig. 1 being taken in a vertical plane passing through the longitudinal axis of the aircraft;

Fig. 2 is a fragmentary sectional view on an enlarged scale of the closure of the present invention; and Fig. 3 is a fragmentary view on an enlarged scale of the releasable lock means of the present invention.

Referring now to the drawings, it will be seen that the cabin of the invention includes a tubular means A formed preferably in its entirety of a transparent material and being located along a surface of revolution whose axis coincides with the axis X which is longitudinal axis of the aircraft. As is evident from Fig. 1, the tubular means A forms a cover for a space in which the pilot is adapted to be located, this tubular means tapering toward the nose of the aircraft. The right end of tubular means A is open, as viewed in Fig. 1, and the left end thereof forms a part of a cone. This left end of tubular means A further includes a sleeve R and an extension F fixed to and carrying the transparent portion of the tubular means, extension F also being conical. The aircraft includes a support means C, S made up of a framework of struts and the like, and this support means includes struts 10 which carry a cylindrical guide P whose axis coincides with axis X. Guide P extends slidably through sleeve R so as to slidably support the tubular means A for movement to the left and right, as viewed in Fig. 1.

In its closed position the right open end of tubular means A is in engagement with a stationary annular abutment G whose center is in axis X. The details of this part of the structure of the invention are illustrated most clearly in Fig. 2 which shows that abutment G is formed by annular plate H and an annular profile member J of U-shaped cross section fixed thereto as by being formed integrally therewith. An annular sealing means in the form of a tube I is located within the member J and has an inlet passing through a wall of member J in the manner shown in Fig. 2. Thus, a fluid under pressure may be supplied to the interior of sealing means I to cause the latter to resiliently press against the tubular means A to form a seal therewith.

Furthermore, it will be noted that annular abutment G and the right end of tubular means A contact each other with surfaces which form part of a cone T whose apex is located in axis X at O. Furthermore, it is pointed ont that the left end wall of tubular means A, as viewed in Fig. 1, forms part of a second cone whose apex is located at O. As a result of this arrangement, the right end of tubular means A will remain in proper engagement with the abutment G even though the different materials of the various parts of the structure shown in Fig. 1 have different coefficients of thermal expansion. In other words, with the above described arrangement the displacement resulting from expansion and contraction of the parts will take place along the cone T so as to maintain a proper closure of the space included within the tubular means A when the latter is in its closed position shown in Fig. 1.

Although many suitable structures may be provided for releasably locking the tubular means A in the closed position thereof shown in Fig. 1, a particularly suitable and preferred releasable lock means constructed in accordance with the present invention is shown in the drawings. Thus, it will be seen that a plurality of members 2 which may, for example, be spherical are fixed to the free right ends of rods which are fixed to their left ends to the left end wall of tubular means A, as viewed in Fig. 1. A curved member 1 is associated with each member 2, each curved member 1 being bifurcated so as to extend on opposite sides of the rod carrying member 2 into engagement with the left face thereof as viewed in Figs. 1 and 3. Fig. 3 showing this arrangement most clearly. The curved member 1 is pivotally carried intermediate its ends by the stationary support means and the lower end of each curved member 1 is pivotally connected to one of a pair of links 6 which are pivotally connected to each other in the manner of a toggle joint. The right end of each right link 6, as viewed, in Figs. 1 and 3, is pivotally connected to the stationary support means. A plurality of links 3 extend radially from the axis X, and each link 3 has its outer end pivotally connected to the joint between each pair of links 6. The inner ends of links 3 are pivotally connected to the right free end of the piston rod which is connected to the piston 4 of the hydraulic servomotor 5 schematically shown in the drawings. Thus, when the piston 4 moves to the right, as viewed in Fig. 1, the above described lock means will be moved to the dotted line position where the curved members 1 release the ball members 2 for movement to the left, as viewed in Fig. 1. It will be noted that these ball members engage sockets, respectively, carried by the stationary support means, when the tubular means A is in its closed position.

The tubular means A is moved to the left, after release of the lock means, through any suitable means such as the hydraulic servomotor D, and Fig. 1 clearly shows that the tubular means is displaced through a distance L to the dot-dash line position of Fig. 1 when the compartment is opened. Of course, an automatic control means is provided whereby at the end of the stroke of piston 4 to the right fluid under pressure is automatically supplied to the servomotor D to move the tubular means A to the left, and when the latter is moved back to its closed position, the end of the stroke of the piston of servomotor D automatically supplies servomotor 5 with fluid under pressure to move piston 4 to the left, as viewed in Fig. 1, for locking the tubular means A in its closed position.

When tubular means A is in its open position shown in dot-dash lines in Fig. 1, the pilot can climb to and from the seat 16, carried by support means C. S, through the gap between tubular means A and the support S.

A particular feature of the invention resides in the fact that when the parts are in the position shown in Fig. 1, each pair of links 6 is arranged in such a way that one link forms an extension of the other link so that the pair of links 6 serve to buttress each other and to transmit forces tending to unlock the lock means directly to the support structure C. S. Furthermore, it may be noted that the links 3 are also in alignment with each other to buttress each other in the same way so as to guarantee that each pair of links 6 will be maintained in alignment with each other.

It will be understood that each of the elements described above or two or more together, may also find a useful application in other types of aircraft differing from the types described above.

While the invention has been illustrated and described as embodied in aircraft cabins, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an aircraft, in combination, support means located along the longitudinal axis of the aircraft; a stationary annular abutment carried by said support means and having its center in said axis; elongated tubular means forming a fuselage portion of the aircraft for enclosing the pilot thereof, having an axis coinciding with said longitudinal axis, having an open end in engagement with said annular abutment for closing the space within said tubular means, and being closed at its end opposite to said open end; and guide means carried by said support means for guiding said tubular means for movement along said longitudinal axis away from said annular abutment to provide access to the spaced surrounded by said tubular means and back to engagement with said abutment for closing said space.

2. In an aircraft, in combination, support means located along the longitudinal axis of the aircraft; a stationary annular abutment carried by said support means and having an outer surface forming part of a cone whose apex is in said axis and whose axis coincides with said longitudinal axis; elongated tubular means forming a fuselage portion of the aircraft for enclosing the pilot thereof, having an axis coinciding with said longitudinal axis, having an open end in engagement with said annular abutment for closing the space within said tubular means, and being closed at its end opposite to said open end, the latter having a conical surface also forming part of said cone when said open end of said tubular means engages said abutment and said opposite closed end of said tubular means forming part of a second cone whose apex coincides with the apex of said first-mentioned cone; and guide means carried by said support means for guiding said tubular means for movement along said longitudinal axis away from said annular abutment to provide access to the space surrounded by said tubular means and back to engagement with said abutment for closing said space, whereby said abutment and open end of said tubular means will remain in engagement with each other irrespective of variations in the coefficients of thermal expansion of said support means, abutment, tubular means, and guide means.

3. In an aircraft, in combination, support means located along the longitudinal axis of the aircraft; a stationary annular abutment carried by said support means and having its center in said axis; elongated tubular means forming a fuselage portion of the aircraft for enclosing the pilot thereof, having an axis coinciding with said longitudinal axis, having an open end in engagement with said annular abutment for closing the space within said tubular means, and being closed at its end opposite to said open end; guide means carried by said support means for guiding said tubular means for movement along said longitudinal axis away from said annular abutment to provide access to the space surrounded by said tubular means and back to engagement with said abutment for closing said space; and releasable lock means for releasably locking said tubular means in said closed position thereof.

4. In an aircraft, in combination, support means located along the longitudinal axis of the aircraft; a stationary annular abutment carried by said support means and having its center in said axis; elongated tubular means forming a fuselage portion of the aircraft for enclosing the pilot thereof, having an axis coinciding with said longitudinal axis, having an open end in engagement with said annular abutment for closing the space within said tubular means, and being closed at its end opposite to said open end; guide means carried by said support means for guiding said tubular means for movement along said longitudinal axis away from said annular abutment to provide access to the space surrounded by said tubular means and back to engagement with said abutment for closing said space; and hydraulic moving means for moving said tubular means to and from said closing position thereof.

5. In an aircraft, in combination, support means located along the longitudinal axis of the aircraft; a stationary annular abutment carried by said support means and having its center in said axis; elongated tubular means forming a fuselage portion of the aircraft for enclosing the pilot thereof, having an axis coinciding with said longitudinal axis, having an open end in engagement with said annular abutment for closing the space within said tubular means, and being closed at its end opposite to said open end; guide means carried by said support means for guiding said tubular means for movement along said longitudinal axis away from said annular abutment to provide access to the space surrounded by said tubular means and back to engagement with said abutment for closing said space; releasable lock means for releasably locking said tubular means in said closed position thereof; and a pair of hydraulic means respectively connected operatively to said tubular means and releasable lock means for first releasing the latter and then moving said tubular means away from said abutment and for moving said tubular means back to said abutment and then actuating said lock means.

6. In an aircraft, in combination, support means located along the longitudinal axis of the aircraft; a stationary annular abutment carried by said support means and having an outer surface forming part of a cone whose apex is in said axis and whose axis coincides with said longitudinal axis; elongated tubular means having an axis coinciding with said longitudinal axis, having an open end in engagement with said annular abutment, and being closed at its end opposite to said open end, the latter having a conical surface also forming part of said cone when said open end of said tubular means engages said abutment and said opposite closed end of said tubular means foring part of a second cone whose apex coincides with the apex of said first-mentioned cone; guide means carried by said support means for guiding said tubular means for movement along said longitudinal axis away from said annular abutment to provide access to the space surrounded by said tubular means and back to engagement with said abutment for closing said space, whereby said abutment and open end of said tubular means will remain in engagement with each other irrespective of variations in the coefficients of thermal expansion of said support means, abutment, tubular means, and guide means; and releasable lock means for releasably locking said tubular means in said closed position thereof.

7. In an aircraft, in combination, support means located along the longitudinal axis of the aircraft; a stationary annular abutment carried by said support means and having an outer surface forming part of a cone whose apex is in said axis and whose axis coincides with said longitudinal axis; elongated tubular means having an axis coinciding with said longitudinal axis, having an open end in engagement with said annular abutment, and being closed at its end opposite to said open end, the latter having a conical surface also forming part of said cone when said open end of said tubular means engages said abutment and said opposite closed end of said tubular means forming part of a second cone whose apex coincides with the apex of said first-mentioned cone; guide means carried by said support means for guiding said tubular means for movement along said longitudinal axis away from said annular abutment to provide access to the space surrounded by said tubular means and back to engagement with said abutment for closing said space, whereby said abutment and open end of said tubular means will remain in engagement with each other irrespective of variations in the coefficients of thermal expansion of said support means, abutment, tubular means, and guide means; and hydraulic moving means for moving said tubular means to and from said closing position thereof.

8. In an aircraft, in combination, support means located along the longitudinal axis of the aircraft; a stationary annular abutment carried by said support means and having an outer surface forming part of a cone whose apex is in said axis and whose axis coincides with said longitudinal axis; elongated tubular means having an axis coinciding with said longitudinal axis, having an open end in engagement with said annular abutment, and being closed at its end opposite to said open end, the latter having a conical surface also forming part of said cone when said open end of said tubular means engages said abutment and said opposite closed end of said tubular means forming part of a second cone whose apex coincides with the apex of said first-mentioned cone; guide means carried by said support means for guiding said tubular means for movement along said longitudinal axis away from said annular abutment to provide access to the space surrounded by said tubular means and back to engagement with said abutment for closing said space, whereby said abutment and open end of said tubular means will remain in engagement with each other irrespective of variations in the coefficients of thermal expansion of said support means, abutment, tubular means, and guide means; releasable lock means for releasably locking said tubular means in said closed position thereof; and a pair of hydraulic means respectively connected operatively to said tubular means and releasable lock means for first releasing the latter and then moving said tubular means away from said abutment and for moving said tubular means back to said abutment and then actuating said lock means.

9. In an aircraft, in combination, support means located along the longitudinal axis of the aircraft; a stationary annular abutment carried by said support means and having its center in said axis; tubular means forming a fuselage portion of the aircraft for enclosing the pilot thereof, having an axis coinciding with said longitudinal axis, having an open end in engagement with said abutment for closing the space within said tubular means and having an end wall distant from said open end thereof; a sleeve having an axis coinciding with said longitudinal axis and fixed to said end wall; and an elongated member carried by said support means, extending along said longitudinal axis through said sleeve and being in slidable engagement therewith so that said tubular means may be slidably moved along said elongated member away from and toward said abutment to give access to the space within said tubular means as well as to close said space.

10. In an aircraft, in combination, support means located along the longitudinal axis of the aircraft; a stationary annular abutment carried by said support means and having its center in said axis; tubular means forming a fuselage portion of the aircraft for enclosing the pilot thereof, having an axis coinciding with said longitudinal axis, having an open end in engagement with said abutment for closing the space within said tubular means and having an end wall distant from said open end thereof; a sleeve having an axis coinciding with said longitudinal axis and fixed to said end wall; an elongated member carried by said support means, extending along said longitudinal axis through said sleeve and being in slidable engagement therewith so that said tubular means may be slidably moved along said elongated member away from and toward said abutment to give access to the space within said tubular means as well as to close said space; and annular resilient means carried by said abutment at said outer surface thereof to provide a sealing engagement between said abutment and tubular means.

11. In an aircraft, in combination, support means located along the longitudinal axis of the aircraft; a stationary annular abutment carried by said support means and having its center in said axis; elongated transparent tubular means forming a fuselage portion of the aircraft for enclosing the pilot thereof, having an axis coinciding with said longitudinal axis, having an open end in engagement with said annular abutment for closing the space within said tubular means, and being closed at its end opposite to said open end; and guide means carried by said support means for guiding said tubular means for movement along said longitudinal axis away from said annular abutment to provide access to the space surrounded by said tubular means and back to engagement with said abutment for closing said space.

References Cited in the file of this patent

UNITED STATES PATENTS

| | | |
|---|---|---|
| 1,278,133 | Gammeter | Sept. 10, 1918 |
| 1,475,304 | Kraft | Nov. 27, 1923 |
| 2,095,020 | Adams | Oct. 5, 1937 |
| 2,351,284 | Overbeke | June 13, 1944 |

FOREIGN PATENTS

| | | |
|---|---|---|
| 370,359 | Germany | Mar. 2, 1923 |
| 468,403 | Italy | Jan. 21, 1952 |
| 604,013 | Great Britain | June 28, 1948 |
| 748,214 | Germany | Oct. 30, 1944 |